United States Patent [19]
Rich

[11] 3,715,809
[45] Feb. 13, 1973

[54] EDUCATIONAL ATMOSPHERIC PARTICLE DETECTOR

[75] Inventor: Theodore A. Rich, Schenectady, N.Y.

[73] Assignee: Environment/One Corporation, Schenectady, N.Y.

[22] Filed: Nov. 5, 1971

[21] Appl. No.: 196,012

[52] U.S. Cl. .................................35/19 B, 356/37
[51] Int. Cl. ....................G09b 23/12, G01n 21/00
[58] Field of Search .........35/19 R, 19 B; 356/37, 36, 356/38

[56] References Cited

UNITED STATES PATENTS

| | | | |
|---|---|---|---|
| 3,019,692 | 2/1962 | Skala | 356/37 |
| 3,037,421 | 6/1962 | Bigelow et al. | 356/37 |
| 3,632,210 | 1/1972 | Rich | 356/37 |

*Primary Examiner*—Harland S. Skogquist
*Attorney*—Charles W. Helzer

[57] ABSTRACT

An educational atmospheric particle detector of low cost construction that can be assembled, disassembled and operated by students and apprentice technicians for classroom and laboratory study purposes. The particle detector is of the condensation nuclei meter type comprising a hollow tubular member that serves as an expansion cloud chamber and is mounted between two end blocks supported on a plurality of threaded rods. The end blocks have inlet and outlet passageways which communicate with the interior of the tubular expansion cloud chamber, and have aligned openings through which a transmission light beam passes. Suitable collimating lens are supported within the aligned openings in the end block members for focusing the light from a light source positioned at one end of the cloud chamber, onto a photo cell or other light sensitive device positioned at the opposite end of the expansion cloud chamber. A novel rotatable disc or diaphram which serves as a light shutter is supported on one of the plurality of supporting rods and can be rotated into or out of the light path in order to modulate the amount of light which is allowed to impinge on the photo cell or other light sensitive detector. With this arrangement zero adjustment calibration of the instrument can be performed. Additionally, a pin hole aperture formed in a small disc supported on the supporting rod is located in the light path between photo cell and adjacent lens. The pin hole aperture serves to restrict the measured light to those light rays parallel to the cloud chamber axis and are normally transmitted without interruption. Upon expansion of the space within the cloud chamber so as to condense water droplets about the particles entrained in a sample gaseous atmosphere being monitored, the cloud of water droplets scatters the light beam and results in a change in the electric output signal from the light sensitive detector device which is a measure of the number of particles entrained in the sample gaseous atmosphere. Additionally, a two-stage expansion is provided for which allows the detector to be used for particle size measurement purposes.

10 Claims, 7 Drawing Figures

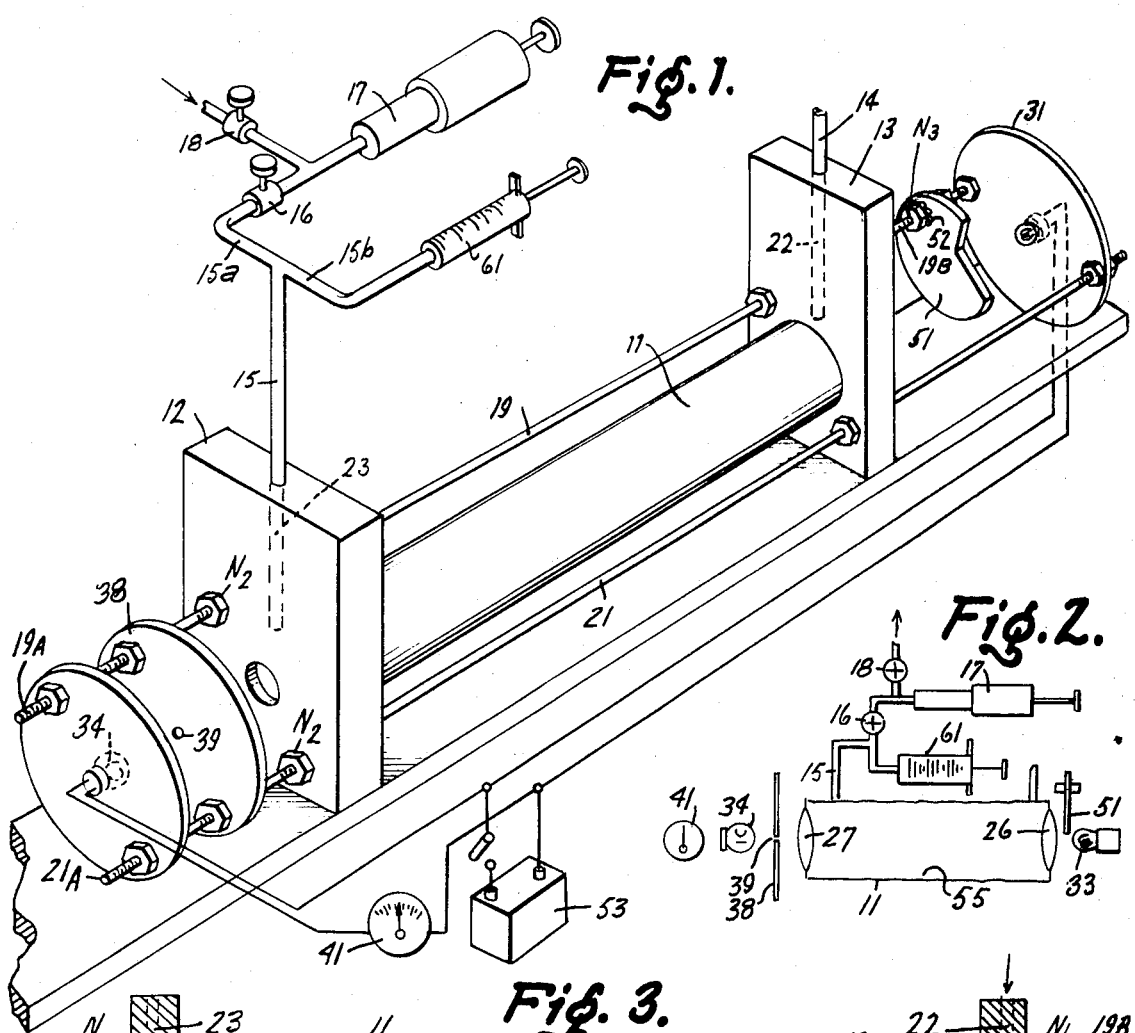
Fig. 1.
Fig. 2.
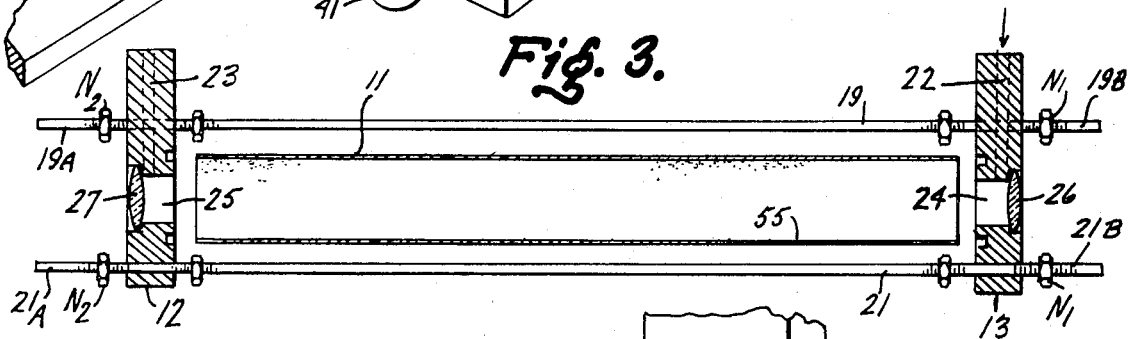
Fig. 3.
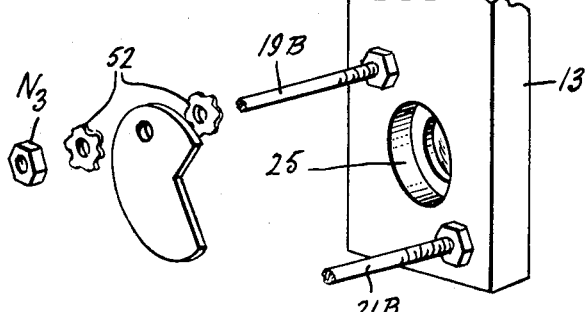
Fig. 4.

3,715,809

EDUCATIONAL ATMOSPHERIC PARTICLE DETECTOR

BACKGROUND OF INVENTION

1. Field of Invention

This invention relates to an educational atmospheric particle detector.

More particularly the invention relates to a low cost, atmospheric particle detector of the type which is referred to as a condensation nuclei meter, and is specially designed for use by students or other unskilled personnel in conducting atmospheric pollution studies.

2. Background Problem

Atmospheric particle detectors of the condensation nuclei meter type have been available to industry, government, and educational institutions for a number of years. One known instrument of this type is described and claimed in co-pending U.S. patent application, Ser. No. 834,822—T.A. Rich-Inventor—filed June 19, 1969, entitled—"Variable Rate-Continuous Flow CN Meter Having Adjustable Meter Expansion Period and Improved Gain"—assigned to Environment/One Corporation, and now U.S. Pat. No. 3,632,210. While these known instruments are quite satisfactory for their intended purpose, they are relatively expensive instruments for use by students and apprentice technicians for educational and training purposes. For such purposes, what is needed is a relatively low cost, simple instrument which embodies the principles of operation of the known condensation nuclei meters, is reliable in operation, and can be assembled, disassembled and operated by unskilled persons such as students and apprentice technicians, and which is relatively inexpensive so that adequate numbers of the instrument can be made available for classroom and laboratory study groups on an economically justifiable basis.

SUMMARY OF INVENTION

It is therefor a primary object of the invention to provide a relatively inexpensive educational atmospheric particle detector of the condensation nuclei meter type which operates reliably but which is low cost and suitable for use by students, unskilled apprentice technicians and the like in conducting air pollution studies and laboratory experiments. A feature of the invention is the provision of a relatively inexpensive, easily assembled atmospheric particle detector employing condensation nuclei meter principles of operation, and which includes a novel, inexpensive zero particle count calibration arrangement that utilizes a low cost, manually adjustable light shutter disposed in the measuring light beam path of the instrument for calibration purposes.

A further feature of the invention is the provision of a novel two-stage expansion volume for use in performing particle size measurement with the educational atmospheric particle detector.

In practicing the invention, an educational atmospheric particle detector is provided which comprises an open ended tubular expansion chamber supported between two end block members on a plurality of supporting rods having means for securing the two end block members with the tubular expansion chamber supported therebetween in assembled relation. The end block members have passageways formed therein which communicate with the inlet and outlet ends of the tubular expansion chamber. Aligned light passageways are formed in each of the end block members for allowing light from a light source positioned at one end of the tubular expansion chamber to pass through the tubular expansion chamber and impinge upon a photo electric light detecting device mounted at the opposite end of the tubular expansion chamber. The light source and photo electric device are mounted on discs secured to the supporting rods at respective ends of the tubular expansion chamber. Provisions are made to enclose the lamp and photo cell to prevent the entrance of stray light. These are not shown in order to simplify the illustration. Collimating lens preferably are secured in the end block members at the respective ends of the tubular expansion chamber. In addition a disc having a pin hole aperture is secured to the supporting rods between the lens and photo electric light detecting device. The pin hole blocks all light rays in the expansion chamber that are not parallel to the expansion chamber axis. Such rays when scattered by the presence of intervening particles can no longer reach the photo cell. During a measurement interval, a sample gaseous atmosphere being monitored is drawn into the tubular expansion chamber, and the expansion chamber subjected to a sudden drop in pressure whereby small liquid drops are formed on each atmospheric particle entrained in the sample. The resultant cloud of droplets scatters the light beam by an amount determined primarily by the number of particles in the sample gaseous atmosphere being monitored because of the natural phenomenon that causes all water drops to attain the same size. The resultant change in the electric output signal derived from the photo electric light detecting device then provides a measure of the number of atmospheric particles present in the sample gaseous atmosphere being monitored. In order to conduct particle size measurement with the instrument, a two-stage expansion can be accomplished with an added syringe-type hypodermic needle serving to perform the initial expansion of the space within the tubular expansion chamber and with an inversely connected bicycle pump performing the second expansion.

BRIEF DESCRIPTION OF DRAWING

These and other objects, features and many of the attendant advantages of this invention will be appreciated more readily as the same becomes better understood by reference to the following detailed description, when considered in connection with the accompanying drawings, wherein like parts in each of the several Figures are identified by the same reference character, and wherein:

FIG. 1 is a perspective view of an educational atmospheric particle detector constructed in accordance with the invention;

FIG. 2 is a schematic outline drawing illustrating the construction of the educational atmospheric particle detector shown in FIG. 1;

FIG. 3 is a longitudinal sectional view taken through the tubular cloud chamber of the atmospheric particle detector shown in FIG. 1;

FIG. 4 is an exploded, perspective view of certain parts of the educational atmospheric particle detector;

DETAILED DESCRIPTION OF PREFERRED EMBODIMENT

Figure 6:
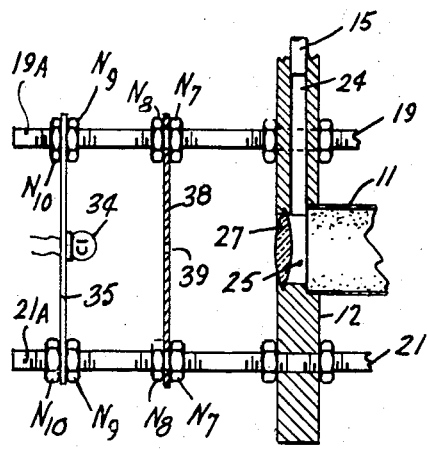
FIG. 6 is a partial sectional view of the left hand end of the educational atmospheric particle detector showing the details of construction of the light sensitive detecting device and a pin hole aperture disc as well as details of mounting for a lens assembly included in the particle detector.

FIG. 1 is a perspective view of a new and improved educational atmospheric particle detector constructed in accordance with the present invention. The educational atmospheric particle detector shown in FIG. 1 is comprised by a hollow, tubular chamber 11 in which an expansion takes place to produce a cloud of water droplets and which is supported between two end block members 12 and 13. The tubular expansion chamber 11 may comprise a section of a hollow brass tube with the end block members comprising plastic members having interior inlet and outlet passageways molded, drilled or otherwise formed for communicating with the interior of the tubular expansion chamber 11. The interior inlet passageway formed in the end block member 13 communicates with an inlet tube shown at 14 through which samples of an atmosphere to be monitored are obtained. An outlet tube shown at 15 is supported on the end block 12 and communicates with an interior outlet passageway formed in the end block member 12. The outlet tube 15 is connected through a suitable check valve indicated at 16 to a reversely connected, conventional, commercially available, hand-operated, bicycle tire pump shown at 17. In actuality, the inlet check valve 16 and an outlet check valve shown at 18 are mounted internally within the conventional hand pump 17, but have been shown in the manner illustrated in FIG. 1 in order to simplify the drawing and still depict the function performed by the valves. These check valves normally are included in such hand pumps but also normally are connected in such a manner that the check valve 18 draws air in from the atmosphere, and discharges through the valve 16 and through a connecting tube to a bicycle tire, football, basketball, or other item to be blown up with the compressed air produced by the hand pump. In the arrangement shown in FIG. 1 the connections are reversed so that upon the handle of the pump 17 being manually withdrawn, the volumetric space within the pump housing is expanded. This causes a positive suction of air through the inlet tube 14, the inlet passageway formed in the end block member 13, the interior of the tubular expansion chamber 11, through the outlet passageway formed internally in the end block member 12, through outlet tube 15, and through intake check valve 16 to the interior of the pump housing 17. Thereafter, upon the handle of the pump 17 being depressed so as to compress the space within the pump housing, air will be discharged out through the outlet check valve 18 to the atmosphere. It will be appreciated that in the process a sample of an atmosphere to be monitored with the instrument is drawn into the tubular expansion chamber 11. Once drawn into the chamber 11, the sample gaseous atmosphere will be humidified to 100% relative humidity due to a water saturated, tubular shaped blotter or other absorbent material 55 secured within chamber 11.

In order to hold the tubular expansion chamber 11 and end block members 12 and 13 in assembled relation, the end block members are secured by means of lock nuts (not shown in FIG. 1) onto threaded supporting rods shown at 19 and 21. There are, in fact, three such threaded rods but the third connecting rod has not been shown in order to simplify the drawings. If desired, fewer or more connecting rods could be used; however, it is believed that sufficient structural rigidity is provided for the assemblage by the use of only three such rods. FIG. 3 of the drawings is a longitudinal sectional view taken through the educational atmospheric particle detector shown in FIG. 1 and further illustrates the manner in which the expansion chamber 11 is held in assembled relationship between the two end block members 12 and 13 by means of the threaded nuts $N_1$ and $N_2$ which are drawn tightly down on each side of the respective end block members so as to clamp members 12 and 13 to the ends of the tubular expansion chamber 11. The inlet passageway formed in the end block member 13 is indicated in dotted outline form at 22 and the outlet passageway molded into the end block member 12 is shown at 23.

In addition to the inlet and outlet passageways 22 and 23, the end block members 13 and 14 each have formed therein longitudinally aligned light passageways shown at 24 and 25. The light passageways 24 and 25 are aligned along the longitudinal axis of tubular expansion chamber 11 and, they are closed in an air tight manner by suitable collimating and focusing lens elements shown at 26 and 27, respectively. The lens elements 26 and 27 are secured in shaped depressions or seats molded in the ends of the end block members around the light passageway 24 and 25, respectively, on the sides thereof opposite to or away from the sides which receive and close the open ends of the hollow tubular expansion chamber 11. The lens elements are sealed in these seats so as to form an air tight enclosure for the space within the expansion chamber 11 upon the inlet and outlet passageways 22 and 23 being closed.

Figure 5:
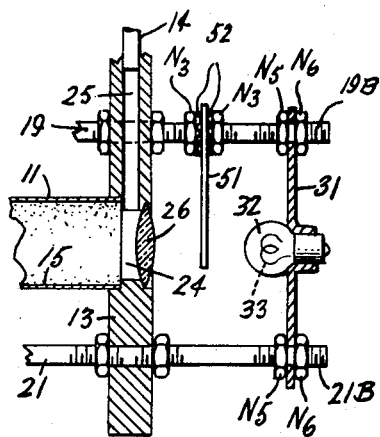
FIG. 5 is a partial sectional view of the right hand end of the educational atmospheric particle detector illustrating the mounting for the light source and the relation of the zero calibration shutter disc together with details of its construction.

It will be noted in FIG. 3 of the drawings that the threaded supporting rods 19, 21 have extensions 19A and 21A which extend beyond the block member 13. The third or additional threaded supporting rod which is not shown in the drawing would have similar extensions. As best shown in FIG. 5 of the drawings, extensions 19B and 21B serve to support a disc 31 in which a light source is supported with the light source comprising a filamentary light bulb 32 having a light emitting filament 33. The light emitting filament 33 of light bulb 32 is properly positioned a precise distance from the lens element 26 by adjusting the position of the threaded nuts $N_5$ and $N_6$ along the length of the extensions 19B and 21B of the threaded supporting rods. For the arrangement illustrated in FIG. 5 the precise distance between the light emitting element 33 and lens element 26 is adjusted to be 38 millimeters and corresponds to the focal distance of the lens element 26. Lens element 26 serves as a collimating lens for focusing light from filament 33 through expansion chamber 11 onto lens 27.

As best seen in FIG. 6, a photo electric light detecting device 34 is secured on a mounting disc 35 that is supported on the extensions 19A and 21A of the threaded supporting rods 19 and 21 by means of the threaded nuts $N_9$ and $N_{10}$. Device 34 may comprise a photo diode, a photo triode, a photo cell, a photo wire cell, a photo sensitive resistor element, or other similar light sensitive electro-optic device. By reason of this arrangement, the aligned light passageways 24 and 25 together with their associated lens elements 26 and 27 focus light from the light source 32 into a collimated light beam that traverses the interior of the expansion chamber 11 and empinges upon the photo electric light detecting device 34. The light transmission path thus formed through the interior of the expansion chamber 11 produces a normal, maximum current, zero particle count electric output signal in the photo electric light detecting device under conditions where no particles magnified by the growth of water droplets, are present in the tubular expansion chamber, as will be explained more fully hereinafter.

Figure 7:
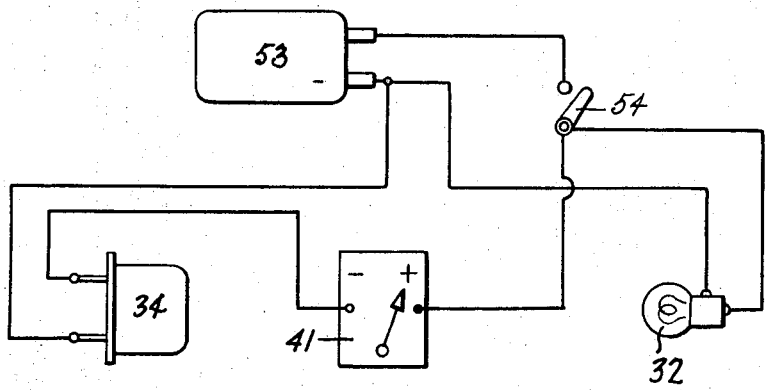
FIG. 7 is a schematic wiring diagram of the electrical portion of the educational atmospheric particle detector.

A pin hole apertured disc shown at 38 is mounted intermediate the lens element 27 and the photo electric light detecting device 34 on supporting rod extensions 19A and 21A by means of threaded nuts $N_7$ and $N_8$. The apertured disc 38 has a centrally located pin hole aperture that is aligned a precise distance from lens element 27 determined by the focal length of the lens element 27. Light parallel to the axis of the expansion chamber 11 is focused by the lens element 27 on the pin hole 39 in apertured disc 38, and only light which passes through the pin hole will hit the photo sensitive surface of the photo electric detector 34. As shown in FIGS. 1 and 7, the output from photo electric detecting cell 34 is supplied to a conventional milliameter 41 for providing an output indication of the change in intensity of the light beam transmitted through the expansion chamber due to scattering by particles in the chamber, and the magnitude of this change (as evidenced by the change in the output indication of meter 41) provides a measure of the number of atmospheric particles entrained in a sample of an atmosphere introduced into the chamber, as will be explained more fully hereinafter.

In order to provide a means for calibrating the electric output signal produced by the photo electric detecting device 34 to provide a zero particle count adjustment for meter 41 whereby, under conditions where no particles are present in the expansion chamber, a reproducible zero count output signal value is obtained on the meter 41 despite dust collection, moisture, ageing of component, etc., meter calibration means are provided in the form of a manually movable shutter shown at 51 in FIG. 1, FIG. 4, and FIG. 5 of the drawings. The shutter 51 is rotably mounted on the threaded supporting rod extension 19B by means of wavey washers best shown at 52 in FIG. 4. The wavey washers 52 and rotable shutter 51 are seated between the $N_3$ nut and the threaded nut which holds end block 13 in place on threaded supporting rod 19. The manually movable shutter 51 is shaped in a manner such that upon rotation more and more of the light from lamp 32 is transmitted to the interior of expansion chamber 11 can be either cut off or allowed to pass, dependent upon the direction of rotation. Thus, by manual rotation of the shutter disc 51, the intensity of the parallel light beam that traverses the interior of the expansion chamber 11, is either increased, or decreased so as to establish a reproducible zero particle count output signal level from the photo electric light detecting device 34.

The use of the manually adjustable light shutter disc 51 obviates the need for a rheostat or other similar device which conventionally is used to control or set the zero particle count output signal level for instruments of this type, but which is not wholly satisfactory even for expensive in-struments, and would be too costly for inclusion on an educational instrument of the type envisioned by the present invention. Additionally, in measuring instruments where a rheostat is employed to control the light level, the light output varies as a high power of the current, and hence requires the use of a fine control not required in a constant resistance versus current measuring situation such as that provided by the present instrument. Secondly, the resistance normally used in such control rheostats is relatively low, since one does not want to waste power, and even with dual rheostats, the wire steps in a wire-wound rheostat do not give stepless or infinite control such as that provided by the manually adjustable shutter disc 51. Hence, in addition to being much cheaper, the manually adjustable shutter disc 51 provides certain operating advantages from the zero adjustment arrangements heretofore employed in instruments of this nature.

As a direct consequence of the above novel type of zero calibration adjustment using the rotatable shutter disc 51, the electrical measurement circuitry required for the educational atmospheric particle detector is quite simple as illustrated in FIG. 7 of the drawings. In FIG. 7, the light bulb 32 is connected directly across the terminals of a conventional dry cell battery 53 through a simple, single pole, single throw, on-off switch 54 which also serves to connect the photo cell 34 through meter 41 across battery 53. To operate the instrument, all that is required is to close switch 54 and then rotate shutter disc 51 in a direction to adjust the reading on meter 41 to read full scale. Meter 41 may constitute a conventional, commercially available 0–1 milliammeter so that for a no particle present condition, its reading would be 1 milliammeter full scale.

Having described the preferred construction for the educational atmospheric particle detector, its operation is as follows. For a more detailed description of the theory and mode of operation of condensation nuclei monitor type atmospheric particle detectors, reference is made to the above-referenced co-pending U.S. application, Ser. No. 834,822. However, for the purpose of the present disclosure the following brief description is believed adequate. Atmospheric particles, often referred to as condensation nuclei, are produced in the atmosphere in many diverse ways either naturally or by reason of human activity. An example of these particles would be very fine particles entrained in the air due to dust storms, volcanic explosions, forest fires, evaporation of ocean spray, and the like. Smoke from combustion processes, and exhaust from internal combustion engines are the primary man-made sources of pollutants to the atmosphere. These particles may range in size from about $2 \times 10^{-7}$ centimeters to $5 \times 10^{-3}$ centimeters dependent upon their source. They vary in concentration from relatively few particles per cubic centimeters of atmosphere to extremely dense concentrations. For example, less than 50 particles per cc are found in carefully filtered air while over 1 million or even 1 billion particles per cc will be measured in heavy city traffic, and in the exhaust of internal combustion engines.

Due to the extremely small size of atmospheric particles, they are difficult to measure directly since their size lies in a range extending from microscopic to submicroscopic, and they are not readily observed. Consequently, the usual direct means of measurement using light absorption and light scattering techniques cannot be applied directly to the measurement of atmospheric particles of this small size. To meet the need, condensation nuclei measuring techniques have been derived which rely on the property of the atmospheric particles to serve as a nucleus or center of condensation for water droplets. By causing condensation of water about each particle as a center of condensation, the effective optical area of the particles can be increased by many orders of magnitude thereby allowing the usual techniques of light scattering and absorption to be employed in their measurement.

It has been determined that atmospheric particles normally serve as centers about which water droplets form, and unless they are present, condensation generally will not occur except at extreme degrees of supersaturation. The mechanism involved in the condensation of water about an atmospheric particle as a center of condensation, generally is dependent both on the size of the atmospheric particle and on the relative humidity of the gaseous atmosphere in which it is entrained. If the relative humidity of the gaseous atmosphere in which the atmospheric particle is entrained tends to rise above 100 percent, such as would occur by an expansion (which produces cooling of the atmosphere), condensation starts the deposition of water on the particles as centers in order to achieve an equilibrium condition. The deposition of water will continue until the humidity is lowered to a new equilibrium condition representing substantially 100 percent R.H. for the new cooler condition. The known atmospheric detectors employing the condensation nuclei technique, rely on this property of the atmospheric particle to serve as a center of water droplet formation for increasing the size of the particle to a point where it can be directly measured using known light scattering and/or absorption techniques.

One known atmospheric particle detector using the above principle which has been employed satisfactorily in the past, is described and claimed in U.S. Pat. No. 3,037,421 issued June 5, 1962. The atmospheric particle detector described in this patent employs an expansion chamber into which air samples to be monitored for atmospheric particles, are introduced periodically on a continuously operating basis. The expansion chamber is traversed by a measurement light beam that then impinges on an electro-optical detector in a manner similar to that described above with relation to FIGS. 1 through 7. Inlet and outlet passageways to the expansion chamber are controlled by synchronously operated, rotary valves which permit a controlled operating cycle. Following the periodic or cyclic introduction of a specimen of a sample gaseous atmosphere to be monitored into the expansion chamber, the pressure within the expansion chamber suddenly is lowered by connection of the expansion chamber to a source of low pressure provided by a vacuum pump, etc., while concurrently closing off the inlet to the expansion chamber. The gaseous sample has been passed through a humidifier to achieve approximately one hundred percent relative humidity prior to expansion. In this manner, a very rapid or sudden expansion of the gaseous sample is achieved whereby precise control of the level of supersaturation of the gaseous sample is attained. As a result, small water droplets are formed about the atmospheric particles entrained in the sample. A count of the resulting cloud of water droplets then is obtained through the medium of the electro-optic detecting device which derives an electric output signal representative of the number of atmospheric particles.

The instrument shown in FIGS. 1 through 7 operates in substantially the same manner as described above with respect to known condensation nuclei monitor type particle detectors. Prior to placing the instrument in operation for measurement purposes, the operator of the instrument should check the water absorbent blotter 55 supported within tubular expansion chamber 11 to see that it is saturated with distilled water prior to placing the instrument in operation. If desired, a continuously operated and easily refillable humidifier could be placed in the gaseous sample inlet line in advance of the expansion chamber; however, for low cost educational type atmospheric particle detector, a distilled water saturated blotter supported within the interior of expansion chamber 11 operates satisfactorily, and adds little to the cost of the instrument.

The on-off switch 54 then is closed to its on position, and a sample of air is flushed through the detector by operating the handle of pump 17 for at least 5 fast-smooth strokes. Thereafter, using the rotary light shutter 51, the output from the photo electric light detecting device 34 is adjusted to provide full scale (one milliampere) output reading on meter 41. Next, using one finger to seal off the inlet opening to inlet tube 14, expansion of the space within the expansion chamber is effected by operating the vacuum pump from its fully closed to its fully open (extended) position in one smooth, fast (but not violent) operation. Keeping the inlet opening sealed closed, and the pump in the expanded (maximum volume) position, the lowest milliamp reading on meter 41 is noted. Then, by referring this reading to a calibration curve which accompanies the instrument, the milliampere reading can be readily converted to a value of condensation nuclei per cubic centimeter. If conditions permit, at least three readings of each atmospheric sample to be monitored should be made, and averaged for accurate results. Where the educational atmospheric particle detector has not been used for some time, or long periods of time have passed between readings, the initial or first reading taken should be discarded in the interest of greatest accuracy.

While the above-described embodiment of the educational atmospheric particle detector does not require the use of a separate inlet check valve to achieve expansion of the space within chamber 11, but instead requires that an operator of the instrument use his finger to seal off the inlet opening 14, such an arrangement is not essential. This has been done in the interest of economy. If desired, a separate closure valve could be employed to achieve the same purpose but would, of course, increase the cost of the detector.

There is another feature included in the new and improved particle detector comprising the present invention which makes it possible to use the instrument for particle size measurement purposes. To best understand this feature, a discussion of the basic physical phenomenon involved will be helpful.

A water droplet will grow larger when the humidity exceeds the following value:

$$\ln S = (1.06 \times 10^{-7})/(r) \quad (1)$$

where $r$ is the radius of the particle in cms, and $\ln S$ is the natural logarith of the supersaturation $S$. Other particles than water may require a higher or lower value of $S$ in order to grow so that control of supersaturation is not a very good method to determine physical size of particles. However, there are many practical cases where one really wants to know when particles will start to grow water droplets. Cloud condensation nuclei particles are generally considered to be those particles on which water will grow at slightly more than 100 percent R.H. and the physical size is of little importance. Fog formations generally are controlled by those particles which will grow at 100 percent R.H. or a little over. Visibility is reduced by such particles when the humidity is high and also can be reduced by some particles which will grow water droplets at less than 100 percent R.H. such as salt particles which will grow water droplets at a relative humidity H greater than 70 percent.

If one were to actually count atmospheric particles as is done in the Aitken counter or in a thermal gradient cloud chamber, it is only necessary to produce the required humidity, and if the particles grow to visible size, the job is done and actual size is immaterial. However, in photo electric counters this approach won't work because the calibration becomes meaningless unless as much water is condensed in the measurement cycle in question as was condensed in the measurement cycle performed during calibration of the counter. For example, usually the calibration is made with a relative humidity H equal to 300 percent (supersaturation =3) and this causes water droplets to grow on practically all particles larger than $10^{-7}$ centimeters in radius. For small supersaturations, the following condition will hold for a value of $S \leq 1.04$.

If $S = 1 + 0.04 = 1 + (1.06 \times 10^{-7})/r$ than $r = 2.6 \times 10^{-6}$ cm. (2)

When an expansion takes place to give a supersaturation of 3, the cooling is about 20° and there is roughly 12 grams of excess water per cubic meter. In contrast, an expansion to give 1.04 percent saturation has about 0.7 grams of excess water. Due to heat evolved on condensing, not all of the water will condense (only about one-half) but the ratio of water available to make water droplets is 17 to 1 and the instrument will read very low. The ratio becomes even higher at lower saturations. This behavior of a CN nuclei for expansions from V to V(1 + Δ) can be summarized as follows where $\Delta \leq 0.1$:

The minimum detectable size = $(10^{-7})/(7\Delta$ radius in cms.

The initial fall in temperature from ambient $(t_1) = 117\Delta°C$.

The temperature after condensation $= t_1 = 43\Delta°C$.

The maximum saturation $= 1 + 7\Delta$.

Water available for drops $= 26\Delta$ grams per cubic meter.

One way around the above problem is to make a fast expansion to give 104 percent R.H., and then to continue the expansion to that used in calibration, but do it slowly enough so that the water vapor liberated by this further expansion condenses on the particles already formed instead of remaining in vapor form which would increase the humidity. This technique is employed on one known condensation nuclei meter type particle detector. The expansion chamber is connected through a valve to an evacuated chamber. The chamber is dioded into two parts by a moveable piston in which there is a small hole (leak). The chamber is evacuated and the valve opened. The total expansion is the same whatever the position of the piston. The part of the expansion volume nearest to the expansion chamber provides a rapid expansion, and the part of the expansion volume separated from the expansion chamber by the leak fills slowly due to the leak. The approach has several contradictory requirements one of which is that the plunger has to define a very small volume for the first expansion of the two-stage expansion thus provided, usually in the order of one percent for useful values. Further, the hole in the leak has to be small to keep the second expansion slow enough. Conversely, the hole should be large enough to give a reasonable flushing time and to get the second expansion over before there is too much heat transfer. Another bothersome characteristic of the leak approach is that it falls if there are no large particles present in the atmosphere being monitored. Since there is greater interest now in particle size measurement and the users of this type instrument are getting more sophisticated, it is desirable to include in the educational atmospheric particle detector comprising the present invention, a capability for performing particle size measurements.

In order to provide a particle size measurement capability, the educational atmospheric particle detector shown in FIG. 1 is provided with a dual outlet connection shown at 15A and 15B. For normal particle counting purposes, where no size measurement is desired, the second outlet 15B is closed with a suitable rubber stopper. Where it is desired to employ the instrument for particle size measurement purposes, a two-stage expansion is provided for by removing the stopper in the second outlet connection 15B and supplying in its place a syringe of the type used in hypodermic needles such as shown at 61 in FIG. 2, is inserted. With this arrangement, expansion of the volume of the syringe will provide a sufficient two-stage volume expansion as set forth in the following description. In this description, the volume provided by the syringe 61 shall be termed to be $P_A$ and the volume provided by the hand pump 17 shall be identified as $P_B$.

With the inlet tube 14 open, a few strokes on the pump 17 ($P_B$) will flush a sample of the atmosphere to be monitored into the expansion chamber. The lamp 32 through lens 26 transmits parallel light through the expansion chamber 11 and lens 27 focuses the light through the pin hole 39 in stop 38 onto the photo electric light detecting device 34. The adjustable shutter 51 is adjusted to give 100 percent full scale deflection on the meter 41 with $P_A$ and $P_B$ in the position of minimum volume. $P_B$ has a volume of 20 percent of the cloud chamber. $P_A$ is a plastic device capable of displacing a small volume of about 2 cc similar to a syringe type hypodermic needle.

To read the total number of particles, $P_A$ is ignored, and after flushing, the inlet tube 14 is closed, and $P_B$ is briskly extended to form a cloud of water droplets. The water droplets change some of the parallel light in the expansion chamber 11 to some angle due to scattering, and because of the stop 38, only parallel light can reach the light meter through pin hole 39. Hence the reading on meter 44 is reduced. The reduced light transmission (full scale transmission is 100) can be interpreted by conversion through an appropriate calibration schedule supplied with the instrument into the number of particles per cubic centimeter. It should be noted that the pin hole aperture provided in stop 39 provides a decided improvement in that it makes the instrument much more sensitive to low concentrations, and really measures transmission. If the pin hole aperture were not provided, the angular scattering due to the cloud of water droplets would not be great enough to have all of the scattered light diverted from the light meter as it should be. This technique for increasing sensitivity of the instrument is quite well known in the optics art.

In order to master the art of particle size measurement a sample of gaseous atmosphere known to have only large atmospheric particles is used in the following experiment. A reading of the sample is taken in the above-briefly described manner in order to obtain a count of the total particles. For example, it will be assumed that this total particle count turned out to be 10,000 particles per cubic centimeter. A new sample is then drawn in and the inlet tube 14 is closed. The volume, $P_A$ is then used to displace two cc, and it will be observed that there is a small deflection of the instrument from its 100 full scale reading which indicates that some water has been condensed due to this small expansion. Next, $P_B$ is extended rather slowly-taking about 1 second to get the full expansion. The reading then should be about the same as the first total particle readings, namely 10,000 particles/cc. The operator of the instrument then should try slower and slower expansion speeds until the reading obtained becomes definitely less than the original total particle count reading. This indicates that the excess water liberated by the second stage expansion of $P_B$ is going to the walls of the expansion chamber instead of to the formation of water droplets. Then, in order to assure reliable measurements, it will always be necessary to use a speed of expansion of $P_B$ faster than this last noted speed.

Next, the operator can then supply a gaseous sample known to have small particles. For example, a propane torch with a good blue flame produces small atmospheric particles which are about $2-4 \times 10^{-7}$ centimeters in radius. The flame from this torch should be directed for a very short time into a large container such as a barrel or drum, etc., which has been used to hold the sample atmosphere used in performing the previously described measurements. Then the total count of particles should be measured as described earlier. This should prove to be a much higher count, for example, 100,000 particles per cc. In performing this last described total count measurement, the volume $P_A$ is not used, and $P_B$ is operated smartly. Then the operator performs a two-stage expansion as described above by using $P_A$ with the two cubic centimeter displacement and thereafter extending $P_B$ at a rate determined to be most satisfactory from earlier experimentations. It will then be found that the deflection obtained is just about what it was before the small nuclei were added ! This is due to the fact that one is reading only the number of large nuclei in the overall mixture. If the two-stage expansion type of reading is then repeated at intervals, it will be found that the reading will gradually increase as the coagulation of the small particles produces bigger particles. This experiment has been performed a number of times with the results described.

From the foregoing description, it will be seen that the two expansion volume technique of particle size measurement has several advantages. These are:
1. The uncertainty of the leak method, when there are not enough big particles present, is eliminated because in the time-delay between the two pump operations, one can see if there are droplets formed by the $P_A$ expansion.
2. The same delay gives time for the water droplets formed by $P_A$ to produce 100% humidity so that the motion of $P_B$ can be made without exceeding the maximum humidity produced by $P_A$.
3. The flush is as fast as ever.
4. The expansion can be easily controlled because $P_A$ is a small percentage of the volume of $P_B$.

From the foregoing description, it will be appreciated that the invention provides a relatively inexpensive, educational atmospheric particle detector of the condensation nuclei meter type which operates reliably and which is suitable for use by students, unskilled apprentice technicians and the like in conducting air pollution studies and laboratory experiments. A feature of the invention is the provision of a relatively inexpensive, easily assembled atmospheric particle detector employing condensation nuclei meter principles of operation, and which utilizes a novel, inexpensive, zero particle count, manually adjustable light shutter disc disposed in the measuring light beam path of the instrument for zero count calibrating purposes. A further feature of the invention is the provision of a novel, two-stage expansion volume for use in performing particle size measurements.

Having described an embodiment of a new and improved, low cost, educational atmospheric particle detector constructed in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined in the appended claims.

What is claimed is:

1. In an educational atmospheric particle detector including means defining an expansion chamber, means defining inlet and outlet passageways to said expansion chamber for introducing into and withdrawing from said expansion chamber specimens of an atmosphere to be monitored for atmospheric particles during each measurement cycle, means for selectively opening and closing the passageways, means for connecting the outlet passageway to a source of low pressure to provide for differential flow of a sample gaseous atmosphere through the expansion chamber with the inlet and outlet passageways in an open condition, means for humidifying the sample gaseous atmosphere, means for selectively closing at least said inlet passageway for at least a short time duration expansion interval for trapping a specimen of humidified gaseous atmosphere to be monitored in the expansion chamber, means for suddenly decreasing the pressure in the expansion chamber during the expansion interval by connection through the outlet passageway to the source of low pressure and radiant energy irradiating and detecting means viewing the interior of the expansion chamber and operative during the expansion interval to derive an output electric signal representative of the change in intensity of the radiant energy produced by a cloud of small liquid droplets formed in the expansion chamber on the atmospheric particles as centers of condensation upon the occurrence of the sudden decrease in pressure, the magnitude of the change in the output electric signal thus derived comprising a measure of the number of atmospheric particles contained in the specimen of gaseous atmosphere being monitored, the improvement comprising meter calibration means formed by a manually movable shutter disposed in the light path of the radiant energy irradiating and detecting means for initial zero adjustment of the magnitude of the electric output signal corresponding to an initial zero particle count condition where the particles have not been magnified in size by water droplet growth.

2. An educational atmospheric particle detector according to claim 1 wherein the means defining an expansion chamber comprises a hollow tubular expansion chamber secured between two end block members that in turn are supported on a plurality of supporting rods having means for securing the two end block members with the tubular expansion chamber supported therebetween in assembled spaced relationship on the supporting rods, the end block members having passageways formed therein which communicate with the respective ends of the hollow tubular expansion chamber and comprise inlet and outlet passageways to the expansion chamber.

3. An educational atmospheric particle detector according to claim 2 wherein each of the end block members have aligned light passageways formed therein and supporting suitable light lens elements for allowing light from a light source mounted at one end of the tubular expansion chamber on a disc supported on the plurality of supporting rods to pass through the aligned light openings in the end block members, traverse the tubular expansion chamber and impinge upon a photo electric light detecting device mounted on a disc secured to the supporting rods at the opposite end of the tubular expansion chamber, the light transmission path thus formed producing a normal zero particle count electric output signal in the photo electric device under conditions where no particles magnified by water droplet growth are present in the tubular expansion chamber, and upon the light path being modified due to scattering by the liquid droplet growth on the atmospheric particles as centers of condensation upon the occurrence of the sudden decrease in pressure in the tubular expansion chamber, a change in magnitude of the electric output signal is produced and is a measure of the number of atmospheric particles entrained in the sample.

4. An educational atmospheric particle detector according to claim 3 wherein the meter calibration means comprises a manually movable disc shutter rotatably supported on one of the supporting rods intermediate the light source and the photo electric detecting device whereby rotation of the disc shutter into or out of the light transmission path allows for zero adjustment of the magnitude of the electric output signal derived from the photo electric detecting device under initial zero particle count conditions.

5. An educational atmospheric particle detector according to claim 4 further including an apertured disc having a pin hole opening mounted on the supporting rods in the light passageway intermediate the photo electric detecting device and the lens element mounted in the adjacent supporting block member whereby parallel light rays from the light source passing through the tubular expansion chamber is restricted to a pin hole source that is focused on the photo electric detecting device.

6. An educational atmospheric particle detector according to claim 5 wherein the humidifying means comprises a tubular roll of porous filter paper supported within the tubular expansion chamber and that is wetted with a suitable humidifying liquid for maintaining the specimen sample gaseous atmosphere in the tubular expansion chamber at substantially 100 percent relative humidity prior to the sudden decrease in pressure.

7. An educational atmospheric particle detector according to claim 6 wherein the source of low pressure providing differential flow of a sample gaseous atmosphere through the expansion chamber and for producing the sudden decrease in pressure is comprised by a reversely connected conventional, commercially available, hand-operated bicycle pump having intake and discharge check valves with the intake check valve comprising the inlet to the pump and being connected to the outlet passageway for the particle detector whereby operation of the pump in the expanded direction causes suction of air to take place through the inlet passageway into the pump through the expansion chamber, and the discharge check valve is connected to discharge into the atmosphere.

8. An educational atmospheric particle detector according to claim 7 further including a dual outlet connection to the outlet passageway of the particle detector with hand-operated bicycle pump being connected to one of the dual outlet connections, and an additional, small volume, hand-operated pump in the form of a hypodermic needle syringe-type expandable volume pump selectively connectable to the remaining dual outlet connection whereby a two-stage expansion of the space within the tubular expansion chamber can be accomplished for particle size measurement purposes.

9. An educational atmospheric particle detector according to claim 1 further including a dual outlet connection to the outlet passageway of the particle detector, the source of low pressure being connected to one of the dual outlet connections, and an additional, small volume, hand-operated pump selectively connectable to the remaining dual outlet connection whereby a two-stage expansion of the space within the tubular expansion chamber can be accomplished for particle size measurement purposes.

10. In an educational atmospheric particle detector including means defining an expansion chamber, means defining inlet and outlet passageways to said expansion chamber for introducing into and withdrawing from said expansion chamber specimens of an atmosphere to be monitored for atmospheric particles during each measurement cycle, means for humidifying the sample gaseous atmosphere, means for selectively opening and closing at least the inlet passageway, means for connecting the outlet passageway to a source of low pressure to provide for differential flow of a sample gaseous atmosphere in a humidified condition through the expansion chamber with the inlet and outlet passageways in an open condition, means for selectively closing said inlet passageways for at least a short time duration expansion interval for trapping a specimen of a humidified gaseous atmosphere to be monitored in the expansion chamber, means for suddenly decreasing the pressure in the expansion chamber during the expansion interval by connection through the outlet passageway to the source of low pressure, and radiant energy irradiating and detecting means viewing the interior of the expansion chamber and operative during the expansion interval to derive an output electric signal representative of the change in intensity of the radiant energy produced by a cloud of small liquid droplets formed in the expansion chamber on the atmospheric particles as centers of condensation upon the occurrence of the sudden decrease in pressure in the expansion chamber, the magnitude of the change in the output electric signal thus derived comprising a measure of the number of atmospheric particles contained in the specimen of gaseous atmosphere being monitored, the improvement comprising a dual outlet connection to the outlet passageway of the particle detector with the first mentioned source of low pressure being connected to one of the dual outlet connections, and a second source of low pressure selectively connectable to the remaining dual outlet connection whereby a two-stage expansion of the space within the tubular expansion chamber can be accomplished for particle size measurement purposes.

* * * * *